United States Patent
Tanabe et al.

(10) Patent No.: US 9,896,053 B2
(45) Date of Patent: *Feb. 20, 2018

(54) SIDE AIRBAG APPARATUS

(71) Applicant: HONDA MOTOR CO., LTD., Tokyo (JP)

(72) Inventors: Jinichi Tanabe, Tochigi (JP); Tatsuo Sayama, Tochigi (JP); Hidetsune Nonaka, Tochigi (JP); Shuhei Fujiwara, Wako (JP); Yoshihiko Morita, Wako (JP)

(73) Assignee: HONDA MOTOR CO., LTD., Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 15/228,619

(22) Filed: Aug. 4, 2016

(65) Prior Publication Data
US 2017/0036635 A1 Feb. 9, 2017

(30) Foreign Application Priority Data
Aug. 6, 2015 (JP) .................................. 2015-156310

(51) Int. Cl.
*B60R 21/207* (2006.01)
*B60R 21/217* (2011.01)
(Continued)

(52) U.S. Cl.
CPC ............ *B60R 21/207* (2013.01); *B60N 2/449* (2013.01); *B60R 21/217* (2013.01);
(Continued)

(58) Field of Classification Search
CPC ................ B60R 21/207; B60R 21/217; B60R 2021/2078; B60R 2021/0032; B60R 2021/0006; B60N 2/449
See application file for complete search history.

(56) References Cited

U.S. PATENT DOCUMENTS 5,501,484 A * 3/1996 Saderholm ............ B60R 21/217
   280/728.2
5,947,630 A * 9/1999 Dillon ..................... B60R 21/20
   280/728.2
(Continued)

FOREIGN PATENT DOCUMENTS

JP 2009-40328 A 2/2009

*Primary Examiner* — Paul N Dickson
*Assistant Examiner* — Timothy Wilhelm
(74) *Attorney, Agent, or Firm* — Westerman, Hattori, Daniels & Adrian, LLP

(57) ABSTRACT

A side airbag apparatus is provided between a vehicle body and a back seat, and includes a base housing configured to house an airbag and an inflator, a base member having upper and lower base attachment portions provided to sandwich the base housing in an upper-to-lower direction and attached to a portion of the vehicle body, and a retainer member configured to hold the base housing from a vehicle back side. Right and left engagement claws at an upper end of a back wall of the retainer member are arranged to engage respectively with engagement holes provided at a portion of the vehicle body on the vehicle back side. A virtual plane passing through the upper and lower base attachment portions and extending along a vehicle front-to-back direction passes between the right and left engagement claws.

6 Claims, 8 Drawing Sheets

(51) Int. Cl.
*B60N 2/44* (2006.01)
*B60R 21/00* (2006.01)

(52) U.S. Cl.
CPC ............... *B60R 2021/0006* (2013.01); *B60R 2021/0032* (2013.01); *B60R 2021/2078* (2013.01)

(56) References Cited

U.S. PATENT DOCUMENTS

| | | | | |
|---|---|---|---|---|
| 6,092,832 A * | 7/2000 | Worrell | ............... | B60R 21/2035 |
| | | | | 280/728.2 |
| 6,126,192 A * | 10/2000 | Enders | ............... | B60R 21/2176 |
| | | | | 280/728.2 |
| 7,204,510 B2 * | 4/2007 | Bossenmaier | ............... | B60R 21/20 |
| | | | | 280/728.3 |
| 7,267,363 B2 * | 9/2007 | Tredez | ............... | B60R 21/207 |
| | | | | 280/728.3 |
| 7,798,519 B2 * | 9/2010 | Kawabe | ............... | B60R 21/207 |
| | | | | 280/728.3 |
| 7,905,307 B2 * | 3/2011 | Kubota | ............... | B60K 1/04 |
| | | | | 165/202 |
| 8,196,954 B2 * | 6/2012 | Choi | ............... | B60R 21/2176 |
| | | | | 280/728.3 |
| 8,316,516 B2 * | 11/2012 | Hoehe | ............... | A44B 18/0007 |
| | | | | 24/452 |
| 8,733,832 B2 * | 5/2014 | Fukawatase | ............... | B60N 2/42 |
| | | | | 297/216.1 |
| 9,022,415 B2 * | 5/2015 | Kim | ............... | B60R 21/215 |
| | | | | 280/728.1 |
| 9,630,584 B2 * | 4/2017 | Fujiwara | ............... | B60R 21/207 |
| 2004/0239080 A1 * | 12/2004 | Berrahou | ............... | B60R 21/203 |
| | | | | 280/728.2 |
| 2009/0039627 A1 * | 2/2009 | Yokota | ............... | B60R 21/201 |
| | | | | 280/730.2 |
| 2016/0009247 A1 * | 1/2016 | Fujiwara | ............... | B60R 21/2171 |
| | | | | 280/728.2 |
| 2016/0009248 A1 * | 1/2016 | Tanabe | ............... | B60R 21/276 |
| | | | | 280/728.2 |
| 2017/0066402 A1 * | 3/2017 | Fujiwara | ............... | B60R 21/231 |

* cited by examiner

SIDE AIRBAG APPARATUS

CROSS-REFERENCE OF RELATED APPLICATION

This application claims priority of Japanese Patent Application No. 2015-156310 filed in Japan on Aug. 6, 2015, the entire contents of which are incorporated herein by reference.

BACKGROUND OF THE INVENTION

Field of the Invention

The present invention relates to a side airbag apparatus configured to buffer shock applied from a vehicle lateral side, and particularly relates to a side airbag apparatus disposed between a vehicle body and a back seat.

Description of the Related Art

Typically, a side airbag system including an inflator configured to inject gas into an airbag, a box-shaped housing box configured to house the airbag and the inflator, and a resin base cover configured to cover the housing box from a vehicle front side has been known as a side airbag apparatus disposed between a vehicle door and a back seat in a vehicle width direction (see, e.g., JP 2009-40328).

In the side airbag apparatus described in JP 2009-40328, when the airbag housed in the metal housing box is swollen by the inflator, the airbag inflates and expands by breaking a thin portion of the resin base cover positioned on the vehicle front side.

Specifically, a shock sensor (not illustrated) detects when a shock of equal to or greater than a predetermined value is applied from a vehicle lateral side, and ignition power is supplied to the inflator. Then, the airbag inflates and expands at the side of a seated passenger.

In the side airbag apparatus described in JP 2009-40328, when the inflator operates to inflate the airbag, the gas pressure of the inflator inflating the airbag puts great load on the housing box.

For this reason, the technique has been demanded, which improves, in inflating and expansion of the airbag, the rigidity of the vicinity of the housing box housing the airbag and the inflator.

Particularly in the above-described typical technique, the housing box of the side airbag apparatus is made of metal in order to improve strength, but on the other hand, it has been demanded that the material of the housing box is changed to resin in order to reduce a weight. Even when the material of the housing box is changed to resin, the technique of improving the rigidity of the housing box in inflating and expansion of the airbag has been still demanded.

SUMMARY OF THE INVENTION

The present invention has been made in view of the above-described problems, and is intended to provide a side airbag apparatus for which the rigidity of the vicinity of a housing box configured to house an airbag and an inflator is improved in inflating and expansion of the airbag.

Moreover, the present invention is further intended to provide a side airbag apparatus whose weight is reduced.

The above-described problems can be solved by the side airbag apparatus of the present invention. The side airbag apparatus is a side airbag apparatus provided between a vehicle body and a back seat. Such a side airbag apparatus includes a inflatable airbag, an inflator configured to supply gas into the airbag, a base member including a base housing configured to house the airbag in a folded state and the inflator and attached between a vehicle door and the back seat, and a retainer member configured to hold the base housing from a vehicle back side. The retainer member is provided with right and left engagement claws provided separated from each other in a vehicle width direction to protrude toward a portion of the vehicle body on the vehicle back side and engaging respectively with engagement holes provided at the portion of the vehicle body.

As described above, since the retainer member is provided with the right and left engagement claws provided separated from each other in the vehicle width direction to protrude toward the portion of the vehicle body on the vehicle back side and engaging respectively with the engagement holes provided at the portion of the vehicle body, the attachment rigidity of the retainer member holding the base housing is improved. As a result, in inflating and expansion of the airbag, the rigidity of the vicinity of the base housing is improved, and the inflating/expansion direction of the airbag can be further stabilized.

Moreover, attachment of the entire side airbag apparatus including the retainer member to the vehicle body is facilitated.

In the above-described configuration, the retainer member preferably may include a back wall disposed on the vehicle back side with respect to the base housing, and right and left side walls each extending forward of the vehicle body from a corresponding one of ends of the back wall in the vehicle width direction. The right and left engagement claws may be provided at one end of the back wall in an upper-to-lower direction.

With the above-described configuration, the force of holding the base housing by the retainer member is enhanced, and the rigidity of attachment of the retainer member to a vehicle body member is further improved.

In the above-described configuration, the base member may include upper and lower base attachment portions provided to sandwich the base housing in the upper-to-lower direction and attached to a portion of the vehicle body, and a virtual plane passing through the upper and lower base attachment portions and extending along a vehicle front-to-back direction may pass between the right and left engagement claws.

As described above, since the upper and lower base attachment portions are provided considering arrangement of the base housing particularly requiring attachment rigidity among portions of the base member, the attachment rigidity of the base housing is further improved in attachment of the base member and the retainer member to a portion of the vehicle body.

As a result, the rigidity of the vicinity of the base housing is improved, and the inflating/expansion direction of the airbag can be further stabilized.

In the above-described configuration, the engagement claws may be upper engagement claws formed in such a manner that an upper end portion of the back wall is partially cut and bent up and engaging respectively with the upper engagement holes provided at the portion of the vehicle body, and the retainer member may be provided with a lower engagement claw provided below the upper engagement claws and engaging with a lower engagement hole provided at a portion of the vehicle body.

Moreover, the lower engagement claw may be provided at one end of the retainer member in the vehicle width direction, the one end being close to the virtual plane.

With the above-described configuration, the rigidity of attachment of the retainer member to the vehicle body is more improved.

Moreover, since the engagement claws are formed in such a manner that the retainer member is partially cut and bent up, the weight of the retainer member can be more reduced as compared to the case where engagement claws are separately attached.

In the above-described configuration, each of the base housing and the retainer member may be formed with a hole into which an assembly shaft portion provided at the inflator is inserted, the holes of the base housing and the retainer member communicating with each other. The assembly shaft portion may be assembled with an assembly member from the side of the hole opposite to the inflator, and the assembly shaft portion may be assembled with at least one of the side walls of the retainer member.

With the above-described configuration, since the assembly shaft portion of the inflator is assembled with the base housing and the side wall of the retainer member, a more compact apparatus in the vehicle front-to-back direction as compared to a typical case of assembly with a base housing and a back wall of a retainer member can be realized.

Moreover, since the retainer member and a portion of the vehicle body engage with each other in the vehicle front-to-back direction in the present invention, interference with the portion of the vehicle body is easily reduced.

According to a first aspect of the invention, since the retainer member is provided with the right and left engagement claws engaging respectively with the engagement holes provided at the portion of the vehicle body, the attachment rigidity of the retainer member holding the base housing is improved. As a result, the rigidity of the vicinity of the base housing is improved in inflating and expansion of the airbag, and the inflating/expansion direction of the airbag can be further stabilized.

Moreover, attachment of the entire side airbag apparatus including the retainer member to the vehicle body is facilitated.

According to a second aspect of the invention, the force of holding the base housing by the retainer member is enhanced, and the rigidity of attachment of the retainer member to the vehicle body member is further improved.

According to a third aspect of the invention, the attachment rigidity of the base housing is further improved when the base member and the retainer member are attached to a portion of the vehicle body. As a result, the rigidity of the vicinity of the base housing is improved, and the inflating/expansion direction of the airbag can be further stabilized.

According to fourth and fifth aspects of the invention, the rigidity of attachment of the retainer member to the vehicle body is further improved. In addition, the weight of the retainer member can be reduced.

According to a sixth aspect of the invention, compactification of the apparatus in the vehicle front-to-back direction can be realized. In addition, interference with a portion of the vehicle body can be easily reduced.

DETAILED DESCRIPTION

A side airbag apparatus of an embodiment of the present invention will be described below with reference to FIGS. 1 to 8.

The present embodiment relates to a side airbag apparatus provided between a vehicle door and a back seat. Such a side airbag apparatus includes a base housing configured to house an airbag and an inflator, a base member provided to sandwich the base housing in an upper-to-lower direction and including upper and lower base attachment portions attached to a portion of a vehicle body, and a retainer member configured to hold the base housing from a vehicle back side. Right and left engagement claws provided at an upper end portion of the retainer member are arranged to engage respectively with engagement holes provided at a portion of the vehicle body on the vehicle back side. Moreover, a virtual plane passing through the upper and lower base attachment portions and extending along a vehicle front-to-back direction passes between the right and left engagement claws.

Figure 1:
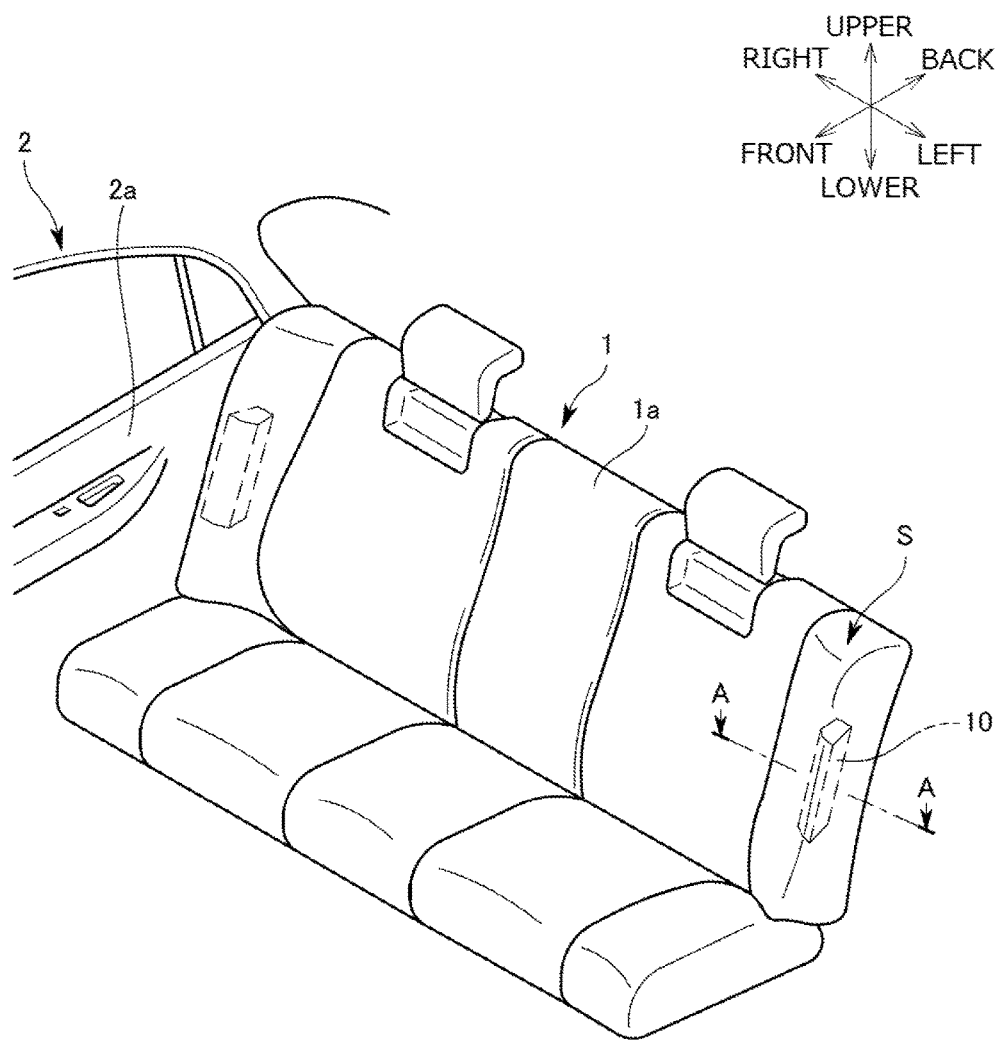
FIG. 1 is a view for describing arrangement of a side airbag apparatus of an embodiment.

A side airbag apparatus S of the present embodiment is an apparatus configured to buffer shock applied from a vehicle lateral side to a seated passenger. As illustrated in FIG. 1, the side airbag apparatus S is disposed between a seat back 1a as a backrest of a back seat 1 and a vehicle door 2a of a vehicle body 2 in a vehicle width direction.

Note that a single side airbag apparatus S is disposed on each of the outer right and left sides of the back seat 1 in the vehicle width direction.

Figure 2:
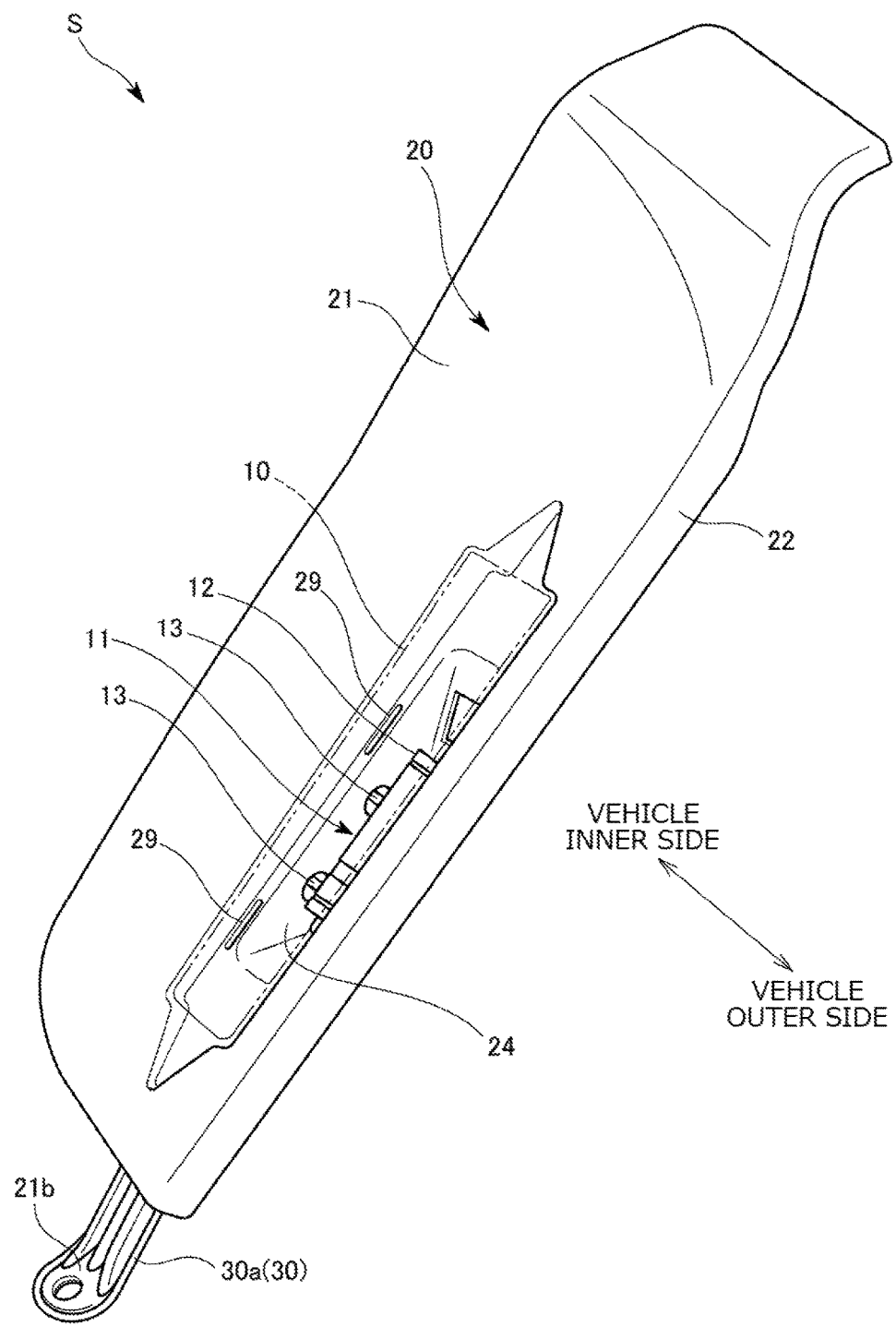
FIG. 2 is a perspective view of a base member of the side airbag apparatus from a front side.
Figure 3:
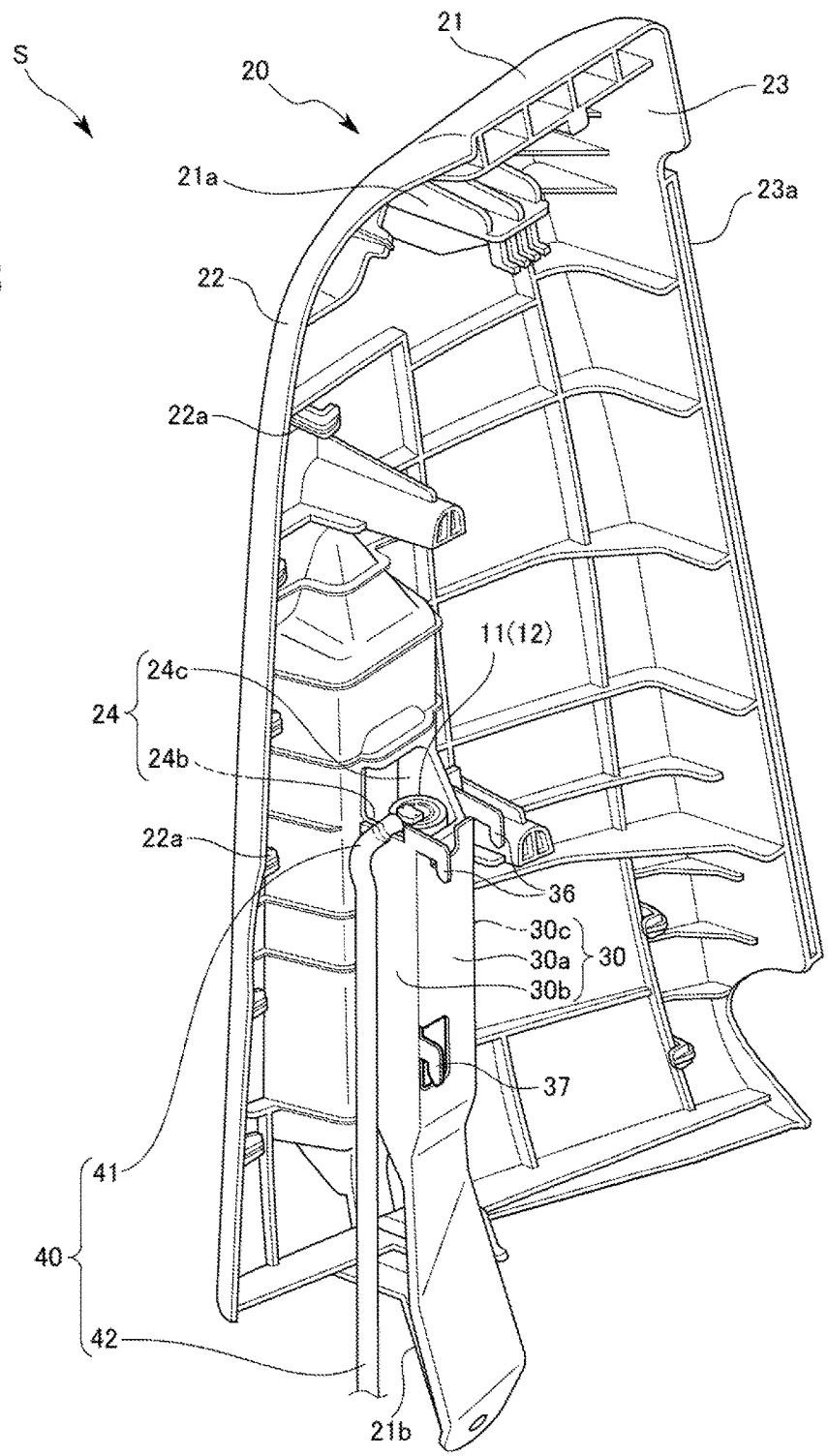
FIG. 3 is a perspective view of the base member from a back side.

As illustrated in FIG. 2, the side airbag apparatus S mainly includes a inflatable airbag 10, an inflator 11 configured to supply gas into the airbag 10, and a base member 20 configured to house the airbag 10 in a folded state and the inflator 11. As illustrated in FIG. 3, the side airbag apparatus S further includes a retainer member 30 configured to hold, from a vehicle back side, the airbag 10 and the inflator 11 housed in the base member 20, and a harness 40 connected to the inflator 11 to supply ignition power to the inflator 11.

Figure 7:
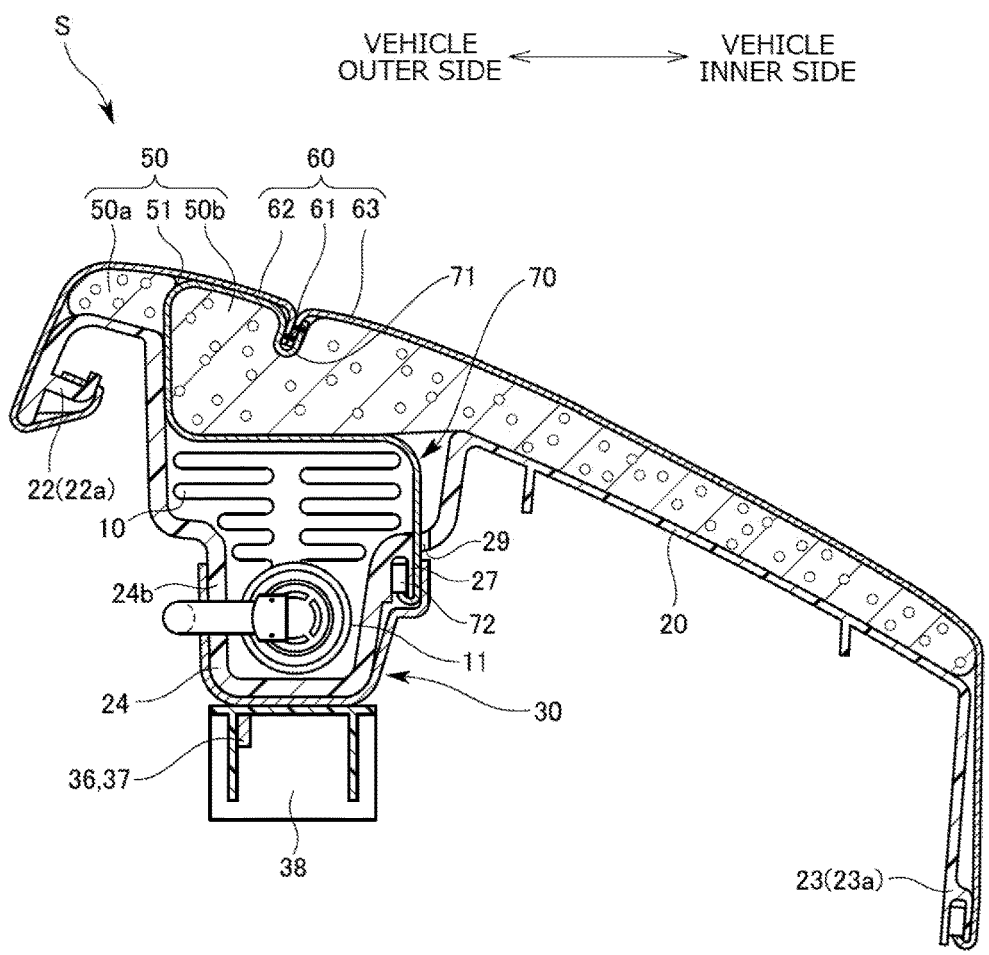
FIG. 7 is a cross-sectional view along an A-A line of FIG. 1, and illustrates the state in which an airbag is housed.

As illustrated in FIG. 7, the side airbag apparatus S further includes a pad member 50 placed at a vehicle front side position of the base member 20, a skin material 60 covering the base member 20 and the pad member 50 from a vehicle front side, and webbing 70 having one end sewn to the skin material 60, having other end locked by webbing locking portions 27 of the base member 20, and configured to guide the inflating direction of the airbag 10.

Figure 8:
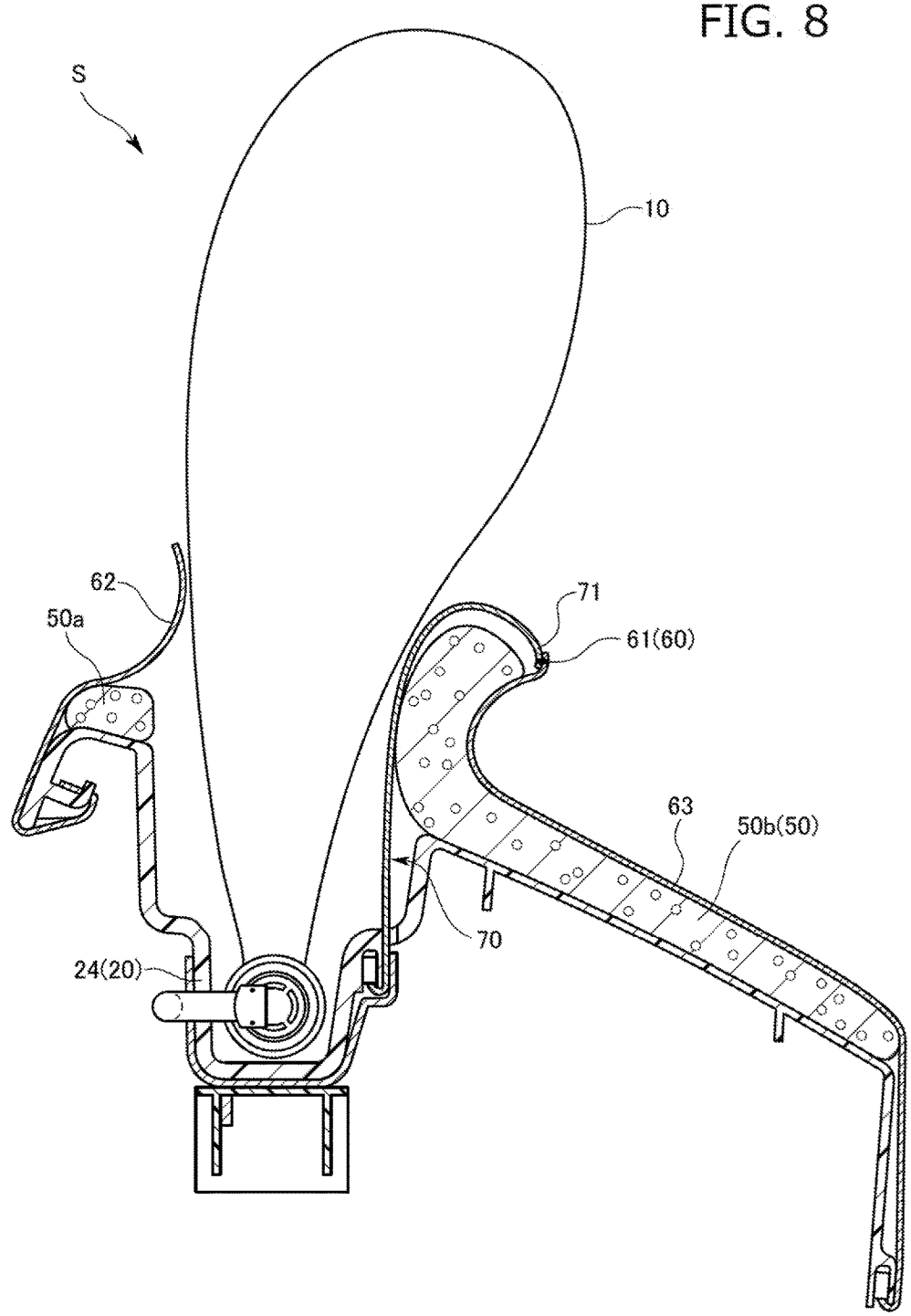
FIG. 8 is a cross-sectional view along the A-A line of FIG. 1, and illustrates the state in which the airbag inflates.

The airbag 10 is formed of a bag-shaped member configured to inflate and expand, as illustrated in FIG. 8, forward of the vehicle body from a folded state illustrated in FIG. 7 to a balloon shape when shock is applied from the vehicle lateral side.

Specifically, the airbag 10 inflates in such a manner that gas is supplied into the airbag 10 from the inflator 11 as a gas generation source coupled to the airbag 10.

As illustrated in FIG. 2, the inflator 11 is formed of a substantially elongated cylindrical gas generation device, and is disposed to be elongated in an upper-to-lower direction.

The inflator 11 includes an airbag coupling portion (not illustrated) protruding forward of the vehicle body with respect to the outer surface of the inflator 11 and coupled to the inside of the airbag 10, a harness connection portion 12 formed at the upper end of the inflator 11 and connected to the harness 40, and assembly shaft portions 13 protruding laterally from the vehicle body with respect to the outer surface of the inflator 11 and assembled with the base member 20 and the retainer member 30.

In the above-described configuration, when shock is applied from the vehicle lateral side, ignition power is supplied from a vehicle battery (not illustrated) disposed on the vehicle body under the feet of the seated passenger to the inflator 11 via the harness 40, and then, the airbag 10 inflates and expands at the side of the seated passenger.

The airbag 10 and the inflator 11 are housed in a later-described base housing 2 4 provided at the base member 20.

The base member 20 is formed of a resin frame member as a base plate of the side airbag apparatus S, and is configured to house the airbag 10 and the inflator 11 as illustrated in FIG. 2.

The base member 20 is formed in a substantially inverted L-shape as viewed from the vehicle lateral side, and is disposed between the seat back 1a and the vehicle door 2a in the vehicle width direction. The upper and lower ends of the base member 20 are each detachably attached to a vehicle body member (not illustrated).

As illustrated in FIGS. 2 and 3, the base member 20 mainly includes a base body 21 disposed between the back seat 1 and the vehicle body 2, and outer and inner base walls 22, 23 continuously extending backward of the vehicle body from both ends of the base body 21 in the vehicle width direction.

The base body 21 is formed of a substantially inverted L-shape plate member. The base body 21 includes, as components, the base housing 24 integrally formed slightly close to a vehicle outer side with respect to the center in the vehicle width direction and recessed backward of the vehicle body, and upper and lower base attachment portions 21a, 21b integrally formed to sandwich the base housing 24 in the upper-to-lower direction and attached to the vehicle body member (not illustrated).

As illustrated in FIG. 2 or 3, the lower base attachment portion 21b protrudes downward continuously from the base body 21, and such a protruding end is attached to the vehicle body member.

Specifically, the lower base attachment portion 21b has a shape for clearance formed by being bent along the shape of the vehicle body on the vehicle back side. The protruding end of the lower base attachment portion 21b is formed with a bolt fastening hole facing the vehicle body member, and the base member 20 and the vehicle body member are attached to each other by bolt fastening.

The outer base wall 22 is disposed facing the vehicle door 2a, and the protruding end of the outer base wall 22 is formed with a plurality of locking claws 22a provided separated from each other in the upper-to-lower direction and configured to lock one end of the skin material 60.

The inner base wall 23 is disposed facing the seat back 1a, and as illustrated in FIG. 3, the protruding end of the inner base wall 23 is formed with a fitting groove 23a which extends elongated in the upper-to-lower direction and into which the other end of the skin material 60 is fitted.

As illustrated in FIG. 2, the base housing 24 is in a box shape formed with an opening on the vehicle front side and elongated in the upper-to-lower direction, and forms a substantially convex internal space. The airbag 10 and the inflator 11 are detachably housed in the internal space of the base housing 24.

Figure 4:
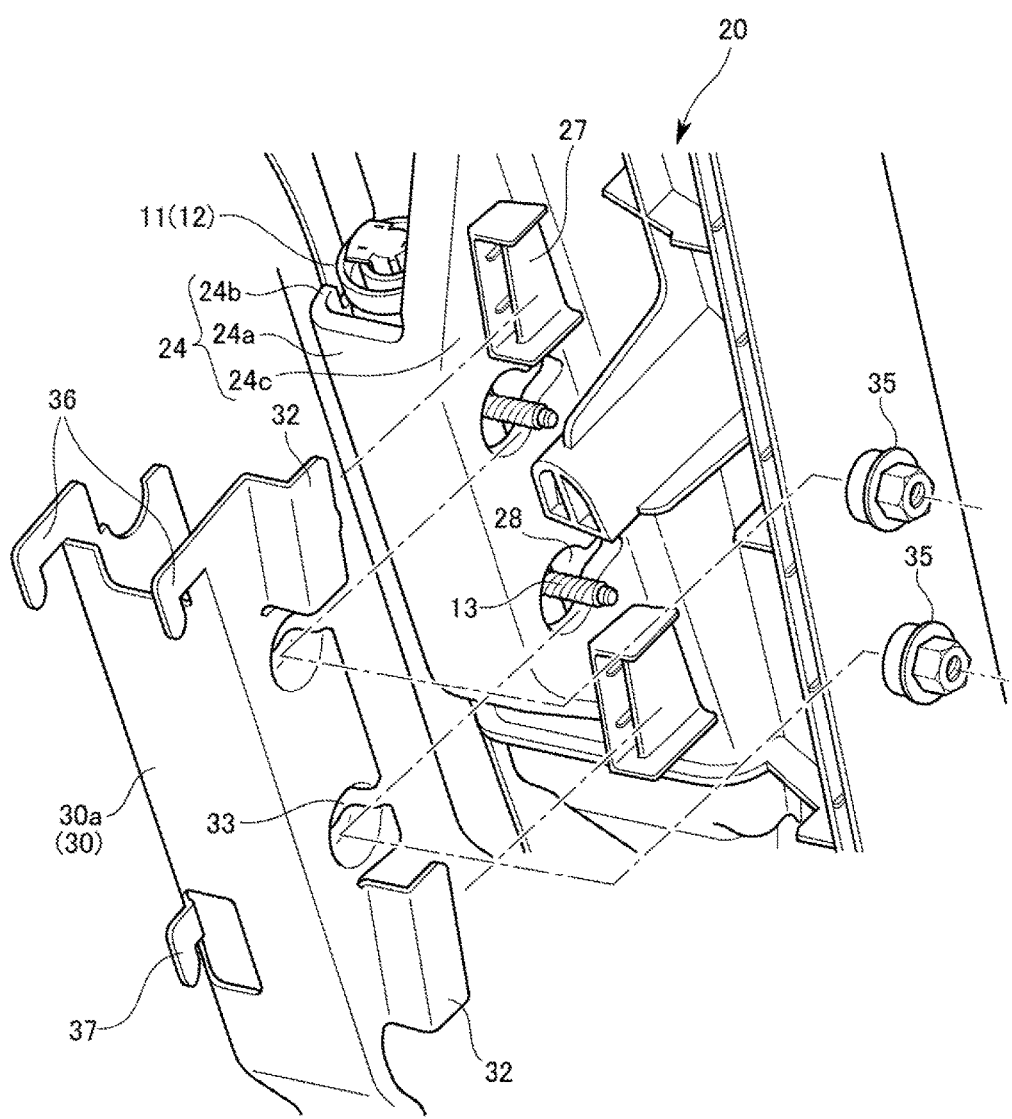
FIG. 4 is an exploded perspective view for describing an assembly structure of an inflator, the base member, and a retainer member.

As illustrated in FIG. 4, the base housing 24 includes a back wall 24a disposed on the vehicle back side with respect to the airbag 10 and the inflator 11, an outer wall 24b extending forward of the vehicle body continuously from one end of the back wall 24a in the vehicle width direction and disposed on the vehicle outer side in the vehicle width direction, and an inner wall 24c extending forward of the vehicle body continuously from the other end of the back wall 24a in the vehicle width direction and disposed on a vehicle inner side in the vehicle width direction.

Note that an upper portion of the base housing 24 is formed with an opening such that an upper end portion of the inflator 11 is exposed.

As illustrated in FIG. 3, the outer wall 24b of the base housing 24 is provided with a cutout facing the harness connection portion 12 of the inflator 11 and being able to support a portion of the harness 40.

As illustrated in FIG. 4, the inner wall 24c is provided with the following portions: two webbing locking portions 27 protruding with a predetermined spacing in the upper-to-lower direction and being able to lock the other end of the webbing 70; and two base holes 28 which are formed with a predetermined spacing in the upper-to-lower direction, which are arranged between the webbing locking portions 27, and into each of which a corresponding one of the assembly shaft portions 13 of the inflator 11 can be inserted.

The retainer member 30 is formed of a metal holding member configured to hold the airbag 10 and the inflator 11 from the vehicle back side, and as illustrated in FIG. 3, is attached to the base housing 24 from the vehicle back side.

The retainer member 30 has a substantially U-shaped cross section. The retainer member 30 includes a back wall 30a disposed on the vehicle back side with respect to the base housing 24, and outer and inner walls 30b, 30c each extending forward of the vehicle body continuously from a corresponding one of both ends of the back wall 30a in the vehicle width direction.

As illustrated in FIG. 3, the back wall 30a of the retainer member 30 protrudes downward toward the lower base attachment portion 21b from a portion of the retainer member 30 holding the base housing 24, and the back wall 30a of the retainer member 30 and the lower base attachment portion 21b are together bolted to the vehicle body member (not illustrated) with a portion of the back wall 30a overlapping with the back surface of the lower base attachment portion 21b.

As illustrated in FIG. 4, the inner wall 30c is provided with the following portions: two webbing holding portions 32 protruding with a predetermined spacing in the upper-to-lower direction to hold the webbing locking portions 27 locking the webbing 70; and two retainer holes 33 which are formed with a predetermined spacing in the upper-to-lower direction, which are arranged between the webbing holding portions 32, and into each of which a corresponding one of the assembly shaft portions 13 of the inflator 11 can be inserted.

The retainer holes 33 and the base holes 28 are arranged to communicate with each other with the retainer member 30 and the base housing 24 being assembled together.

In the above-described configuration, each assembly shaft portion 13 of the inflator 11 is inserted into a corresponding one of the base holes 28 and a corresponding one of the retainer holes 33, and such an inserted end is assembled with an assembly member 35 as an assembly nut to fix the inflator 11, the base member 20, and the retainer member 30 together, as illustrated in FIG. 4.

Figure 5:
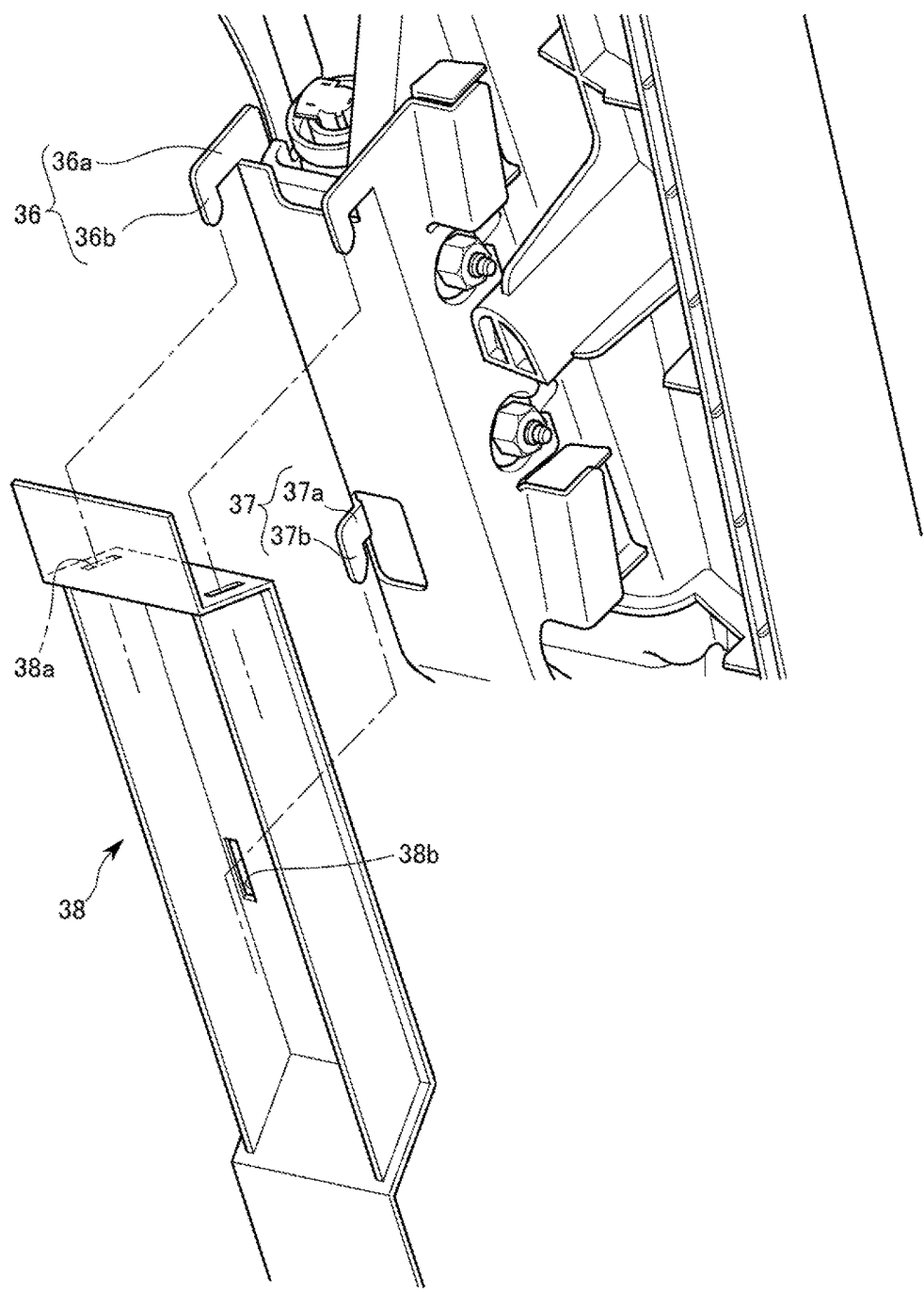
FIG. 5 is an exploded perspective view for describing an assembly structure of the retainer member and a vehicle body member.

As illustrated in FIGS. 4 and 5, the back wall 30a is provided with the following portions: right and left upper engagement claws 36 formed in such a manner that an upper end portion of the back wall 30a is partially cut and bent up to protrude backward of the vehicle body; and a lower engagement claw 37 formed in such a manner that a portion of the back wall 30a below the upper engagement claws 36 is cut and bent up to protrude backward of the vehicle body.

As illustrated in FIG. 5, the upper engagement claws 36 and the lower engagement claw 37 protrude toward a vehicle body member 38 positioned on the vehicle back side, and are arranged to engage respectively with upper engagement holes 38a and a lower engagement hole 38b formed at the vehicle body member 33.

As illustrated in FIGS. 4 and 5, each upper engagement claw 36 is in an inverted L-shape. Each upper engagement claw 36 mainly includes a first protrusion 36a continuously extending from the upper end portion of the back wall 30a toward the vehicle body member 38, and a second protrusion 36b bent downward, i.e., toward a corresponding one of the upper engagement hole 38a of the vehicle body member 38, continuously from the protruding end of the first protrusion 36a and inserted into the corresponding one of the upper engagement hole 38a.

Similarly, the lower engagement claw 37 is in an inverted L-shape. The lower engagement claw 37 mainly includes a first protrusion 37a and a second protrusion 37b continuously extending from the protruding end of the first protrusion 37a and inserted into the lower engagement hole 38b of the vehicle body member 38.

In the above-described configuration, the upper engagement claws 36 are arranged respectively at the right and left ends of the retainer member 30, and the lower engagement claw 37 is disposed only on one of the right and left ends of the retainer member 30, as illustrated in FIGS. 3 and 4.

The downwardly-protruding portion of the retainer member 30 is bolted to the vehicle body member (not illustrated) with the downwardly-protruding portion overlapping with the back surface of the lower base attachment portion 21b of the base member 20.

With this configuration, the rigidity of attachment of the upper portion of the retainer member 30 to the vehicle body member is ensured by the right and left upper engagement claws 36. Moreover, the rigidity of attachment of the lower portion of the retainer member 30 to the vehicle body member is ensured by the lower engagement claw 37 and the bolted downwardly-protruding portion. In addition, since the lower engagement claw 37 is disposed only at one end, the weight of the retainer member 30 is reduced.

In the above-described configuration, a virtual plane L passes through the upper and lower base attachment portions 21a, 21b provided for vehicle body attachment at the base member 20, and extends along a vehicle front-to-back direction. Such a virtual plane L passes, as illustrated in FIG. 6, between the right and left upper engagement claws 36, and also passes through the lower engagement claw 37.

With this configuration, in attachment of the base member 20 and the retainer member 30 to the vehicle body, the attachment rigidity of the base housing 24 particularly requiring rigidity among the portions of the base member 20 is further improved. As a result, in inflating and expansion of the airbag 10, the rigidity of the base housing 24 is improved, and the expansion direction of the airbag 10 can be further stabilized.

Figure 6:
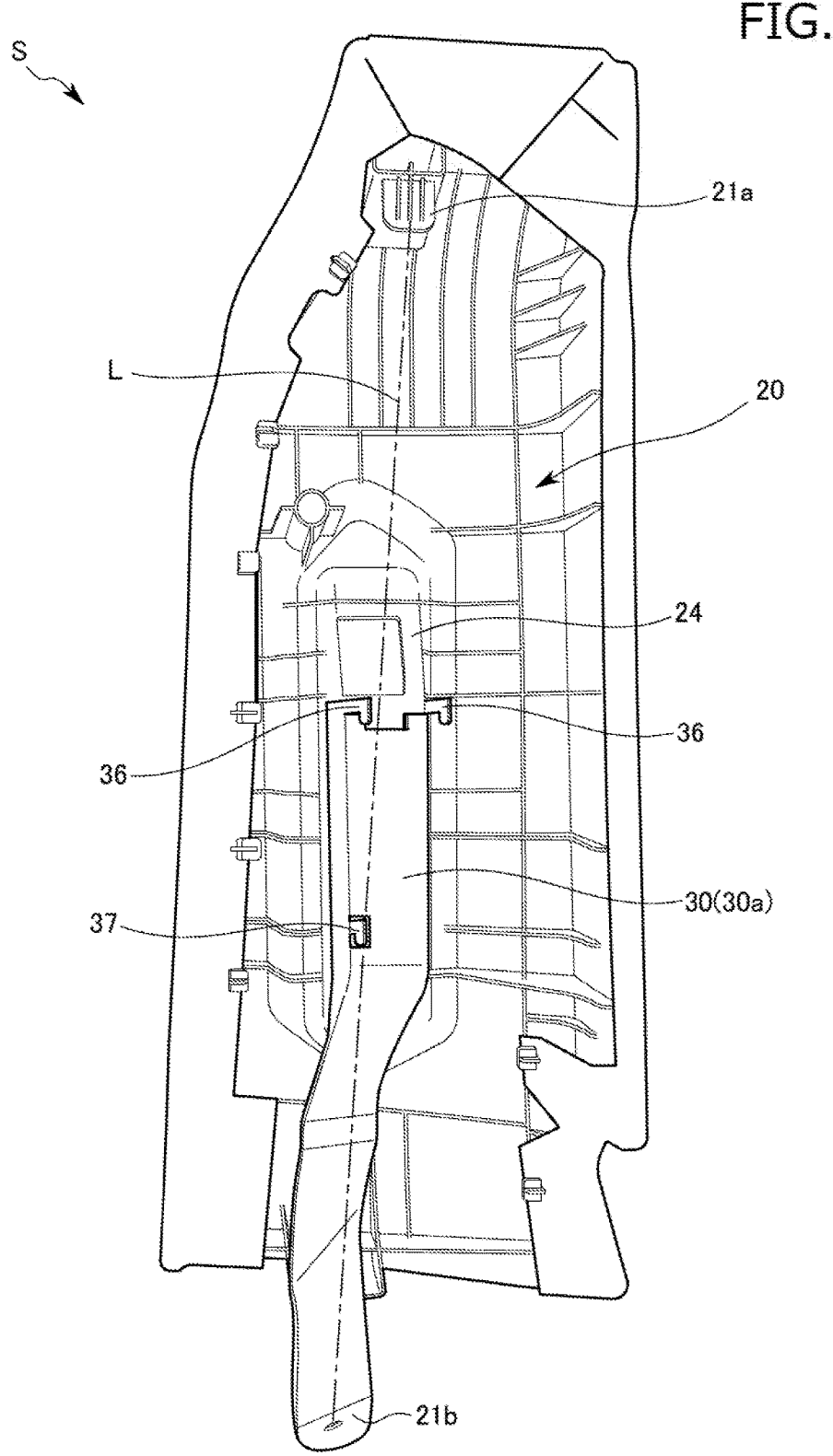
FIG. 6 is a back view of the side airbag apparatus.

In the above-described configuration, the retainer member 30 is disposed such that a portion of the vehicle body member 38 is sandwiched between the back wall 30a and each of the upper and lower engagement claws 36, 37 in the vehicle front-to-back direction, as illustrated in FIG. 6.

With this configuration, the force of holding the retainer member 30 on the vehicle body is enhanced, and rattling of the retainer member 30 is reduced. Moreover, the base member 20 and the retainer member 30 efficiently receive reactive force generated in inflating and expansion of the airbag 10.

The harness 40 is a wire harness configured to supply ignition power to the inflator 11, and is formed in such a manner that a plurality of electrical wires are packed into a corrugated tube and a coupler is attached to each end of the corrugated tube.

As illustrated in FIG. 3, the upper end 41 of the harness 40 is connected to the harness connection portion 12 at the upper end of the inflator 11, and the lower end 42 of the harness 40 is connected to the vehicle battery disposed on the vehicle body under the feet of the seated passenger. The harness 40 extends elongated in the upper-to-lower direction.

As illustrated in FIG. 7, the pad member 50 is formed of a cushion material placed between the base member 20 and the skin material 60, and is disposed across the entire surface of the base member 20 on the vehicle front side.

Note that the pad member 50 is fixed to a pad attachment portion (not illustrated) provided at the base member 20, and therefore, is coupled to the base member 20.

A portion of the pad member 50 facing the base housing 24, specifically a portion of the base housing 24 facing the outer wall 24b, is formed with a pad opening 51 penetrating the pad member 50 in the vehicle front-to-back direction.

The pad member 50 is integrally provided with an outer pad member 50a disposed on the vehicle outer side with respect to the pad opening 51 and an inner pad member 50b disposed on the vehicle inner side with respect to the pad opening 51.

The pad opening 51 is an opening elongated in the upper-to-lower direction, and the webbing 70 is inserted into the pad opening 51 from the skin material 60 toward the base member 20.

The pad opening 51 and each webbing locking portion 27 are positioned opposite to each other with respect to the airbag 10 in the vehicle width direction.

In the above-described configuration, when the airbag 10 inflates and expands as illustrated in FIG. 8, the pad member 50 is, in the vehicle width direction, divided into the outer pad member 50a and the inner pad member 50b at the pad opening 51 as a dividing point.

At this point, since the inflating direction of the airbag 10 is guided by the webbing 70, the airbag 10 can expand without scattering a portion of the pad member 50 on the vehicle front side with respect to the base housing 24.

As illustrated in FIG. 7, the skin material 60 is equivalent to a cover member configured to cover the base member 20 and the pad member 50 from the vehicle front side. A skin breakable portion 61 configured to break in inflating and expansion of the airbag 10 is formed corresponding to the center of the base housing 24 at the substantially center of the skin material 60 in the vehicle width direction.

The skin material 60 mainly includes an outer skin material 62 disposed on the vehicle outer side of the skin breakable portion 61, and an inner skin material 63 disposed on the vehicle inner side of the skin breakable portion 61. The outer skin material 62 and the inner skin material 63 are, at one ends thereof, coupled together at the position of the skin breakable portion 61.

The other end of the outer skin material 62 on the vehicle outer side is locked across the upper-to-lower direction by the locking claws 22a of the outer base wall 22, and the other end of the inner skin material 63 on the vehicle inner side is fitted into the fitting groove 23a of the inner base wall 23.

Specifically, the other end of the outer skin material 62 is formed with locking holes for locking using the locking claws 22a, the locking holes being formed across the upper-to-lower direction. A resin trim code for fitting the inner skin material 63 into the fitting groove 23a is sewn to the other end of the inner skin material 63.

In the above-described configuration, when the airbag 10 inflates and expands as illustrated in FIG. 8, such expansion is made such that the skin material 60 is divided into the outer skin material 62 and the inner skin material 63 at the skin breakable portion 61 as the dividing point.

The skin breakable portion 61 is disposed to overlap with the airbag 10 in the vehicle width direction.

The webbing 70 is formed of a fabric member configured to guide the inflating/expansion direction of the airbag 10 forward of the vehicle body.

As illustrated in FIG. 7, one end 71 of the webbing 70 is attached to the skin breakable portion 61 of the skin material 60, and the webbing 70 extends continuously from the one end 71 to cover the pad member 50. The other end 72 of the webbing 70 is locked by the webbing locking portions 27 provided at the base housing 24.

Specifically, the webbing 70 continuously extends outward of a vehicle from the one end 71 sewn to the skin breakable portion 61 of the inner skin material 63 along the front surface of the inner pad member 50b, and reaches the portion facing the pad opening 51.

Then, the webbing 70 passes through the pad opening 51 to continuously extend along the vehicle outer side surface and the back surface of the inner pad member 50b, and reaches a webbing insertion hole 29 provided at the inner wall 24c of the base housing 24.

Then, the webbing 70 passes through the webbing insertion hole 29 to continuously extend to the webbing locking portions 27, and is locked by the webbing locking portions 27.

At this point, the resin trim code for locking using the webbing locking portions 27 is sewn to the other end 72 of the webbing 70.

In the above-described configuration, when the airbag 10 inflates and expands as illustrated in FIG. 8, the webbing 70 guides the inflating direction of the airbag 10 to the direction toward the skin breakable portion 61 of the skin material 60.

The one end 71 of the webbing 70 expands, together with the inner pad member 50b and the inner skin material 63, forward in the vehicle front-to-back direction, and also expands inward in the vehicle width direction.

In the above-described configuration, the retainer member 30 holding the airbag 10 and the inflator 11 from the vehicle back side is supported by the vehicle body member 38 positioned on the vehicle back side with respect to the retainer member 30, as illustrated in FIG. 7.

Specifically, the back wall 30a of the retainer member 30 and each of the upper and lower engagement claws 36, 37 of the retainer member 30 sandwich a portion of the vehicle body member 38 in the vehicle front-to-back direction.

The right and left upper engagement claws 36 of the retainer member 30 are, in the vehicle width direction, sandwiched by a portion of the vehicle body member 38.

Thus, when the airbag 10 inflates and expands, the rigidity of the periphery of the base housing 24 is improved, and the inflating/expansion direction of the airbag 10 can be further stabilized.

Other Embodiments

In the above-described embodiment, the upper engagement claws 36 are formed at the upper portion of the retainer member 30, and the lower engagement claw 37 is formed at the lower portion of the retainer member 30, as illustrated in FIG. 4. However, the present invention is not limited to such a configuration. Only one of the upper engagement claw 36 or the lower engagement claw 37 may be formed at the retainer member 30, or a center engagement portion may be instead formed at the center of the retainer member 30 in the upper-to-lower direction.

Note that in the case where lower engagement claws 37 are provided respectively at the right and left ends of a retainer member 30 and an upper engagement claw 36 is disposed only at one of the right and left ends of the retainer member 30, an upper end portion of the retainer member 30 preferably protrudes upward, and such an upwardly-protruding portion is preferably bolted to a vehicle body member (not illustrated) on the vehicle back side.

In the above-described embodiment, the upper engagement claws 36 and the upper engagement holes 38a together form a hook-shaped engagement structure as illustrated in FIG. 5, but the present invention is not limited to such a structure. Such engagement may be made using a snap-fit, or needless to say, may be made in a hook shape.

Moreover, each upper engagement hole 38a is formed as a through-hole, but the present invention is not limited to such a hole. Each upper engagement hole 38a may be formed as a recess.

In the above-described embodiment, the upper and lower engagement claws (engagement portions) 36, 37 of the retainer member 30 engage respectively with the upper and lower engagement holes (engagement target portions) 38a, 38b of the vehicle body member 38, as illustrated in FIG. 5. However, the present invention is not limited to such a configuration. Conversely, engagement holes may be formed at the retainer member 30, and engagement claws may be formed at the vehicle body member 38.

In the above-described embodiment, the back wall 30a of the retainer member 30 and the upper and lower engagement claws 36, 37 contact and sandwich a portion of the vehicle body member 38 as illustrated in FIG. 6, but the present invention is not limited to such a configuration. The retainer member 30 may be disposed such that at least the back wall 30a and the upper and lower engagement claws 36, 37 sandwich a portion of the vehicle body member 38.

That is, when the retainer member 30 and the vehicle body member 38 engage with each other, a clearance may be somewhat formed between the back wall 30a and the vehicle body member 38, or may be somewhat formed between each upper engagement claw 36 and the vehicle body member 38.

In the above-described embodiment, the webbing locking portions 27 are formed at the inner wall 24c of the base housing 24 as illustrated in FIG. 7, but the present invention is not limited to such a configuration. The webbing locking portions 27 may be formed at the outer wall 24b or the back wall 24a of the base housing 24.

Preferably, the webbing locking portions 27 are, at the base housing 24, formed on the vehicle inner side in the vehicle width direction with respect to the airbag 10 and the inflator 11.

With this configuration, the webbing 70 allow the airbag 10 to more stably inflate and expand forward of the vehicle body.

This is because of the following reasons. Of the base housing 24 housing the airbag 10, the side close to the outer wall 24b in the vehicle width direction is supported by the vehicle door 2a with a relatively-high rigidity, and the side close to the inner wall 24c in the vehicle width direction is supported by the back seat 1 with a relatively-high elasticity. Thus, the airbag 10 tends to inflate and expand toward the highly-elastic back seat 1 in the vehicle width direction.

For these reasons, the webbing locking portions 27 are provided at the inner wall 24c such that guiding toward the inner wall 24c is preferentially made by the webbing 70. As a result, the inflating/expansion direction of the airbag 10 is further stabilized.

In the above-described embodiment, the assembly shaft portions 13 of the inflator 11 are assembled with the inner wall 24c of the base housing 24 as illustrated in FIG. 4, but the present invention is not limited to such a configuration. The assembly shaft portions 13 of the inflator 11 may be assembled with the outer wall 24b or the back wall 24a of the base housing 24.

Preferably, the assembly shaft portions 13 are assembled on the side close to the inner wall 24c of the base housing 24 in the vehicle width direction.

This is because such a configuration improves supporting rigidity on the side close to the inner wall 24c of the base housing 24, and therefore, the inflating/expansion direction of the airbag 10 is further stabilized as described above.

In the above-described embodiment, the side airbag apparatus S used for the back seat of the automobile has been described as a specific example, but the present invention is not limited to such an apparatus. The side airbag apparatus S may be used for, e.g., a front seat of an automobile, a seat for a vehicle such as a train and a bus, and a seat for a transportation such as an airplane and a ship.

In the above-described embodiment, the side airbag apparatus S of the present invention has been mainly described.

Note that the above-described embodiment has been set forth as a mere example for the sake of easy understanding of the present invention, and is not intended to limit the present invention. Changes and modifications can be made to the present invention without departing from the gist of the present invention, and needless to say, the present invention includes all equivalents thereof.

What is claimed is:

1. A side airbag apparatus installed in a vehicle between a door of the vehicle and a back seat of the vehicle, the side airbag apparatus comprising:
    an airbag that is inflatable;
    an inflator configured to supply gas into the airbag;
    a base member comprising,
        a base housing configured to house therein the airbag in a folded state and the inflator, and
        attachment portions attached to a vehicle body provided between the door of the vehicle and the back seat; and
    a retainer member disposed along a back side of the base housing and configured to hold the base housing from the back side thereof in a vehicle front-to-back direction,
    wherein the retainer member on a back side thereof has right and left engagement claws at locations apart from each other in a vehicle width direction, the right and left engagement claws protruding toward the vehicle body which faces the back side of the retainer member and being configured to engage respectively with engagement holes formed at the vehicle body.

2. The side airbag apparatus according to claim 1, wherein the retainer member comprises,
    a back wall elongated generally in a vehicle upper-to-lower direction and disposed along the back side of the base housing, the back wall having side edges in the vehicle width direction, and
    right and left side walls each extending forward from one of the side edges of the back wall in the vehicle front-to-back direction, and
    wherein the right and left engagement claws are provided at one of vertical ends of the back wall, the vertical ends being vertical in the vehicle front-to-back direction and in the vehicle width direction.

3. The side airbag apparatus according to claim 2, wherein the base member comprises as the attachment portions upper and lower base attachment portions such that the base housing is disposed between the upper and lower base attachment portions in the vertical direction and along a virtual plane which passes through each of the upper and lower base attachment portions and extends along the vehicle front-to-back direction, and
    wherein the right and left engagement claws are positioned such that the virtual plane passes between the right and left engagement claws.

4. The side airbag apparatus according to claim 3, wherein the vehicle body further comprises a lower engagement hole at a position lower than the engagement holes which engage with the right and left engagement claws,
    wherein the right and left engagement claws are integral portions of the retainer member such that an upper vertical end of the back wall has been partially cut and bent up so as to form each of the right and left engagement claws, and
    wherein the retainer member further comprises a lower engagement claw that is provided at a position lower than the right and left engagement claws and corresponding to the position of the lower engagement hole of the vehicle body, thereby engaging therewith.

5. The side airbag apparatus according to claim 4, wherein the lower engagement claw is provided at one of the side edges of the back wall in such a position that the one of the side edges is closer to the virtual plane than an other of the side edges in the vehicle width direction.

6. The side airbag apparatus according to claim 2, further comprising:
    a shaft member provided with the inflator for assembling the inflator, the base housing, and the retainer member together, the shaft member being provided with an assembly member engageable with the shaft member; and
    a hole formed at each of the base housing and the retainer member and axially aligned with the shaft member so as to allow the shaft member to penetrate therethrough from a side of the inflator and engage with the assembly member at an axial end of the shaft member,
    wherein the hole of the retainer member is formed in at least one of the side walls thereof such that the shaft member is assembled at the at least one of the side walls.

* * * * *